July 9, 1957
A. FREEMAN
2,798,586
CONVEYOR SYSTEM
Filed July 14, 1953
3 Sheets-Sheet 1
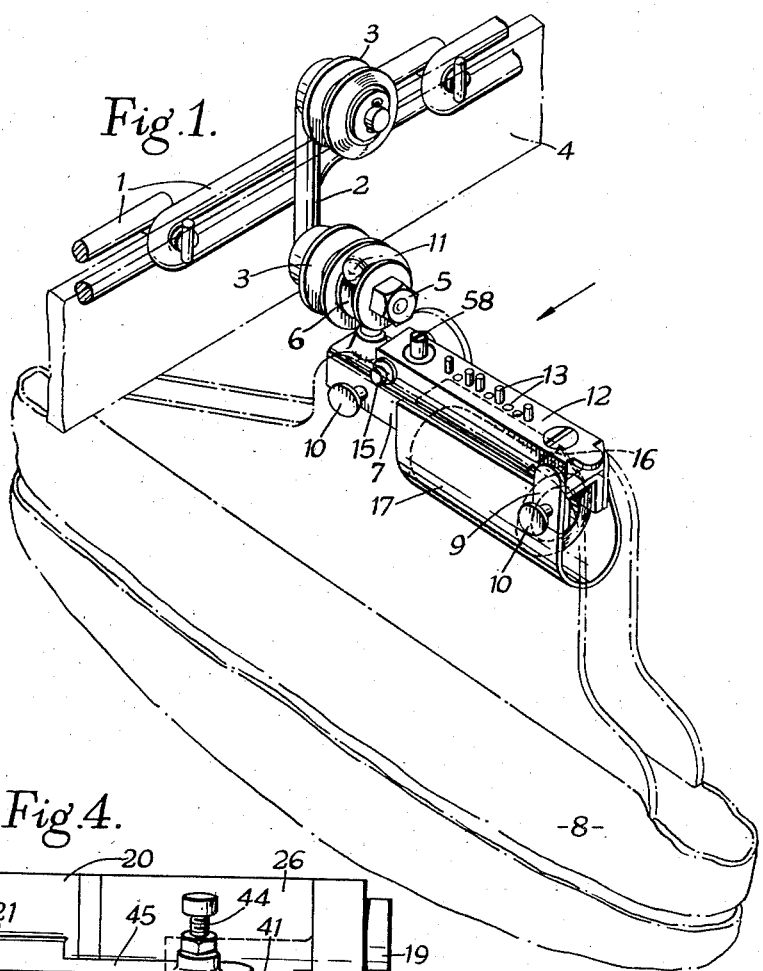
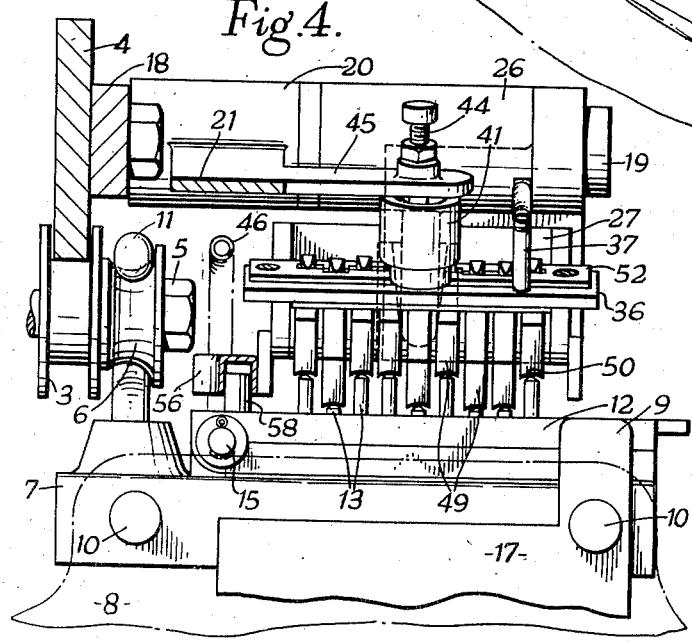

July 9, 1957 A. FREEMAN 2,798,586
CONVEYOR SYSTEM
Filed July 14, 1953 3 Sheets-Sheet 3

United States Patent Office 2,798,586
Patented July 9, 1957

2,798,586

CONVEYOR SYSTEM

Alfred Freeman, Isham, near Kettering, England

Application July 14, 1953, Serial No. 367,784

Claims priority, application Great Britain July 14, 1952

10 Claims. (Cl. 198—38)

The present invention is concerned with conveyor systems by means of which goods can be transported and delivered or dealt with automatically at a predetermined place along the system, as selected by the loader or chosen automatically.

In our Patent Nos. 2,751,091, 2,757,781, 2,758,698, 2,755,908 and patent application Serial No. 353,492, we have described various forms and features of conveyor systems whereby goods transported on the systems can be automatically discharged or otherwise dealt with at pre-selected stations en route.

The present invention is concerned with conveyor systems of this character and which comprise a conveyor for transporting goods, a plurality of index devices which are permanently or detachably attached to the conveyor in association with particular goods or batches of such goods and each comprise a set of elements each of which can be selectively projected or retracted, thereby to form different combinations, and a plurality of reader mechanisms which are cited at various positions along the conveyor and which are each responsive to a particular index setting so as to select an index device exhibiting that combination and accordingly to trip means acting on the goods associated with that particular device. Hereinafter conveyor systems of this character are referred to as being "of the character set forth."

The reader or selector mechanisms in the prior patent applications indicated, can assume various forms appropriate to the index devices which it has to read, but generally speaking, is a mechanism comprising a pivoted plate or arm which, in response to the arrival of a correlated index setting, tips forward to bring a catch into the path of a trip mechanism, thereby to operate the latter and so effect the discharge or dumping of the corresponding goods from the conveyor or the initiation of some other treatment of such goods.

It is an object of the present invention to ensure that the set index elements shall be brought into precise location relatively to the reader mechanism for proper "sensing" thereof and reliable operation of the system.

A further object is to provide a mounting frame or support for the reader mechanism, which is mounted or suspended in floating fashion so that it can, if necessary, move and adapt itself to a passing index device. In this connection, the frame can be capable of a degree of rocking in planes transverse to the line of travel of the conveyor, or in a horizontal plane, and preferably both, i. e. with at least a limited degree of universal adjustment.

Further, with the reader mechanisms disclosed in the patent applications noted above, each index device passes slidingly under each and every reader mechanism, so that the projected elements thereof are subjected to the weight of the feeler levers or fingers concerned, the pivotable reader plate, and the trip catch, the latter, in fact, being held up in a non-operative position by the passing index device unless the latter is set to the appropriate combination.

It is another object of the instant invention to hold the reader plate and trip catch in a raised position away from the feeler fingers during the actuation of the latter by a passing index device, and only allow the plate to contact and "test" the fingers after this index device has set them to the corresponding combination. In other words, the plate and catch are temporarily lifted away from the feeler fingers during their setting by the index device.

Other objects and features of the invention are hereinafter set forth.

One embodiment of the conveyor system embodying the present invention is illustrated by way of example in the accompanying drawings, in which:

Figure 1 is a perspective illustration of a detail of the conveyor chain, showing the hooked attachment thereto of an index device and a work carrier.

Figure 4 is an end view of the mechanism taken on the line IV—IV of Figure 2, and in the direction of the arrows.

Figure 2:
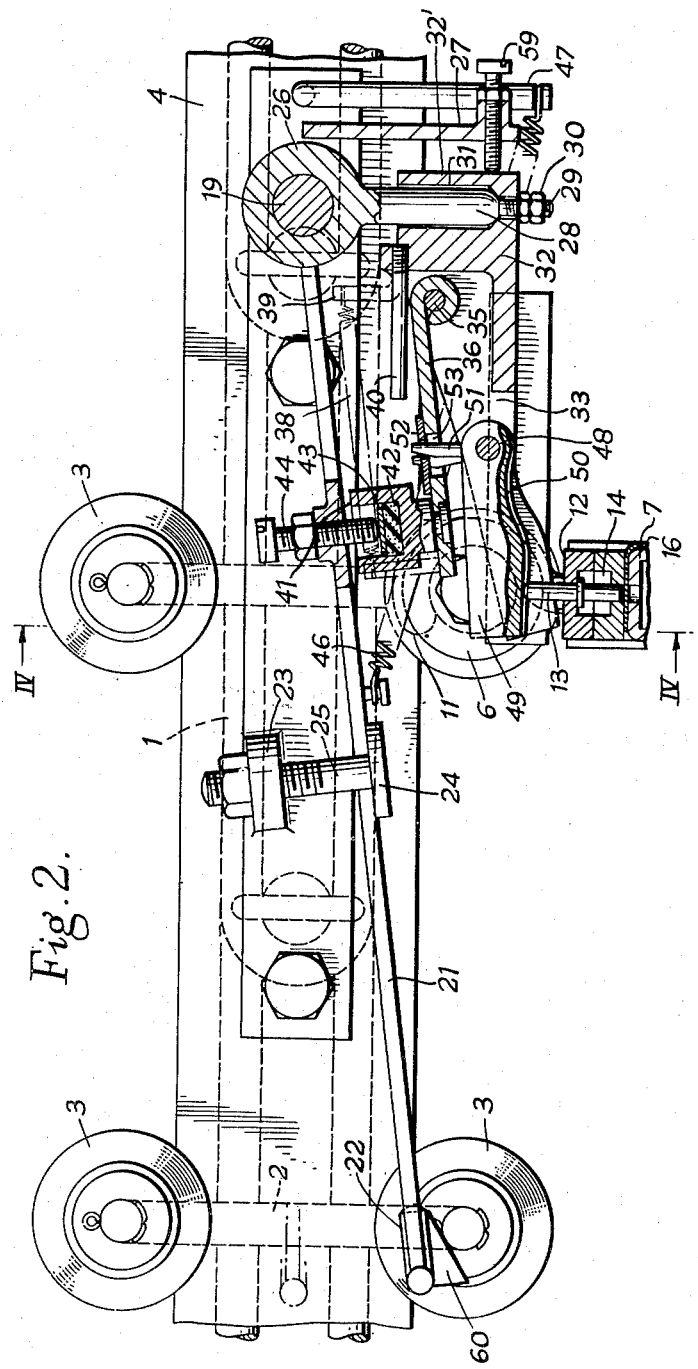
Figure 2 is a side view, with parts in vertical section on line II—II of Figure 3, of a reader mechanism in accordance with the present invention disposed at a discharge station along the conveyor circuit, this view indicating the operation of the mechanism by an appropriately-set index device.

The arrangement illustrated is applied to an endless conveyor chain which is arranged to circulate through a work room in a boot and shoe factory (quoted merely as an example of the use of the invention) and in so doing passes a number of machines and operatives capable of performing different operations on the work. As will be understood, different types of shoes are manufactured in different ways or by different operations, or in some cases although the operation is in effect the same it is performed on different machines, so that the specific arrangement now to be described is adapted to enable the single conveyor to be used for routing the batches of work to different stations, i. e. by-passing some and stopping at others.

Thus the work is passed in a carrier from machine to machine and is automatically rejected from the conveyor at selected stations. The operator receiving a particular batch of work machines this batch, then replaces it in the carrier, sets the index combination of this carrier to the selected next station, and then hooks the carrier and its index device on the conveyor, whereafter these are automatically discarded at the selected next station or machine, and so on.

The conveyor chain used is of one of the link forms described in our patent application Serial No. 329,340 i. e. is made up of links 1 of hairpin form with a cross piece 2 which is outturned at each end and serves to carry at each of these parts a roller 3 by means of which it is guided and supported on a rail track 4.

In this particular case, however, the lower outturned limb of the cross piece 2 of selected links arranged at intervals along the chain is extended somewhat and has secured thereto, by means of a nut 5, an outer and non-rotatable roller 6 which is intended to form a mounting for the support 7 for a work carrier 8.

This support comprises a member of inverted channel form which is provided with upstanding lugs 9 at the outer end, and towards the other has the index device, to be referred to later, hingedly connected thereto on its upper side. The lugs 9 and the other end of the downturned limb of the channelled support 7, at each side of the latter, each carry an outstanding stud 10 for the attachment of the upper end of the work carrier 8 which, in this instance, takes the form of a flexible bag.

This bag has buttonholes at its upper end for mounting on the studs 10, whereby the bag is carried in slung fashion from the support 7 and at the same time has its upper end or mouth temporarily closed.

At its inner end the inverted channel support 7 has a hook 11 upstanding from the top limb of the channel, this hook being so shaped that it fits in the groove in the non-rotatable roller 6, so enabling the support, index device and work carrier to be quickly hooked on the chain for the purpose referred to above, then serving to suspend these members on the conveyor chain alongside and below the latter.

The index device is of a form described in application Serial No. 331,630, i. e. is comprised of a bar-form housing 12 (conveniently made in two superimposed halves for ready access to its interior) which is provided internally with a chamber 14 and serves to receive an aligned set of index elements 13 in the form of pins each of which can be vertically adjusted up or down relatively to the housing, thus enabling the pins to be set to the required "combination." The index housing or bar 12 is pivoted at 15 to the upper side of the work carrier support 7 and at its outer end is arranged for quick-release fastening to the lugs 9, whereby the operative can set or adjust a punched card 16 between the index mechanism and support. In this particular instance, moreover, the channelled support 7 has a depending scroll 17 which is secured to one depending limb and serves to receive and hold a roll of punched cards during the use of the device. All these features are described in patent application Serial No. 331,629.

Provided at appropriate stations along the conveyor are reader mechanisms which are illustrative of the present invention and which are destined to test passing index mechanisms and, in appropriate cases, to reject the support, index device and work carrier concerned.

Each of these mechanisms has a bracket by means of which it is secured to the rail 4, this bracket comprising a plate 18 with a fixed rod 19 outstanding laterally therefrom across the path of travel of the successive index devices and having rotatable thereon a sleeve 20 carrying a forwardly-projecting arm 21 of bar form carrying, at its outer end, a trip means comprising a hook-form nose or pin 22. The latter is disposed in vertical register with the path of the hooks 11 of the work carrier supports and such that, when the free end of the arm 21 is tilted down, with the sleeve 20 rotating about the rod 19, the nose 22 will engage the oncoming hook 11 and, by the consequent abutment, cause this to rotate on its curved seat on the fixed roller 6 until the hook 11, the support 7, and the carrier 8 attached thereto, drop off the roller 6, i. e. are rejected from the conveyor.

The uppermost and lowermost positions of the arm 21 are limited by stops provided by a lug 23 outstanding from the plate 18 and by the head 24 of a bolt 25 which is screwed into the lug 23 and provides for adjustment of the lower limit of travel of the arm 21, if so required.

Mounted and pinned on the rod 19 is a fixed sleeve 26 carrying at its rear side a depending plate 27, and at its underside, a spigot 28 which has a screw threaded extension 29 at its lower end carrying lock nuts 30. The spigot 28 passes, with all round play, through a bore 31 provided in a sleeve 32' of back plate 32 and downwardly tapered at the sides and thereby supports the reader plate and its associated parts in suspended fashion.

Hence, this back plate has a pair of forwardly-projecting side plates 33 which in turn fixedly carries a pair of opposed side cheeks 34. Mounted between the plates 33 is a transverse spindle 35 which forms a pivot for the reader plate 36 which is of squat T-shape. At its forward end the plate 36 is provided with an upstanding pin 37 to which is anchored one end of a tension spring 38 secured, at its other end, to an arm 39 carried by the back plate 32. This tension spring strives constantly to draw the forward end of the reader plate 36 upwards, and it will be noted that a stop 40 is secured in the back plate 32 to limit the extent of potential upward pivoting of the reader plate in this way.

In addition the reader plate carries at its forward end an upstanding, open-topped socket 41 with a rubber pad 42 seated in the base of the socket and surmounted by a wear-resistant washer 43, and entering this socket is a set screw 44 which passes through a lateral ear 45 on the arm 21. As a result, the arm 21, when tilted downwards, exerts pressure on the reader plate 36 so as to rock this downwards at its forward end, the arm 21 being normally urged into this position by a tension spring 46 which is more powerful than spring 38 and is anchored at one end to the underside of arm 21 and at its other end to a member 47 secured to, and depending from, the mounting plate 18.

Also disposed transversely between the side plates 33 is a second spindle 48 which serves as a common pivot for a set of feeler fingers 49 which are disposed side by side and are spaced from one another by an amount corresponding to the spacing of the index pins 13 of the various index devices. These fingers are all of like bar form and are each loosely pivoted on spindle 48 at their rear ends. Each finger, moreover, has at its underside a groove 50 for engagement with, and the guided passage of, an upstanding index pin. In addition it has, secured thereto, at its rear end, an upstanding pin 51 which cooperates with a plate 52 disposed transversely across a rectangular opening 53 in the reader plate 36 and detachably secured to this plate by means of screws 54.

Figure 3:
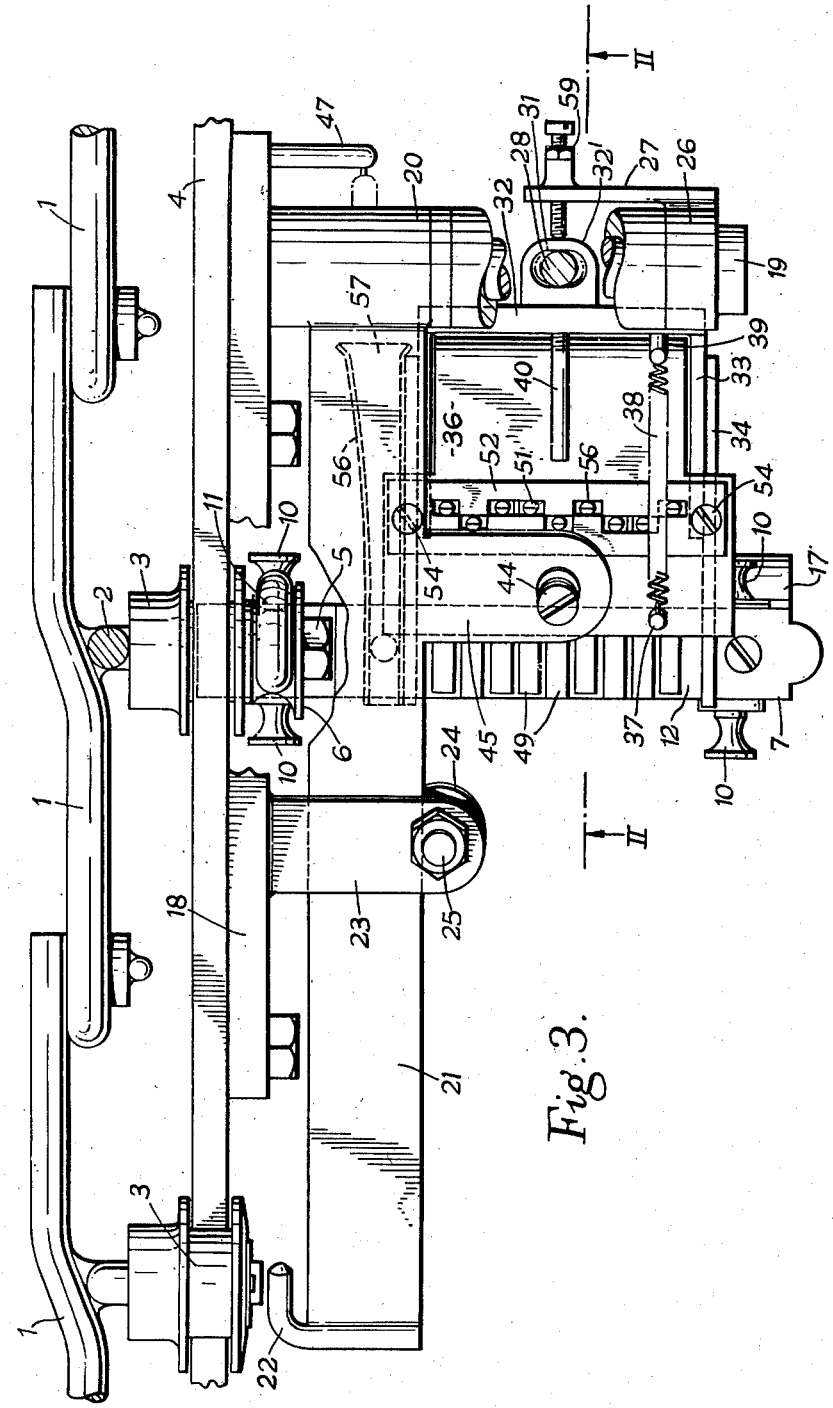
Figure 3 is a plan view of this mechanism with parts broken away.

As will be observed more particularly from Figure 3 of the drawings, the plate 52 is provided with apertures 55 each of sufficient size to permit the passage therethrough of the corresponding pin 51, each of the apertures being selectively disposed in a forward or rear position, regarded in the direction of travel of the conveyor, whereby the plate, in the majority of cases, will be seen to present two relatively-offset and interrupted rows of such apertures, according to the combination to which it is dedicated.

By virtue of the fact that they are pivoted on spindle 48 at their rear ends, the fingers 49 will tend to drop down under gravity at their forward ends, but the arrangement is such that the front edge of opening 53 in the reader plate will always prevent the fingers from dropping into the vertical status. If desired, however, the rear ends of each of the fingers could have a tail cooperating with a common fixed cross piece (not shown) secured between the side plates 33, for this purpose.

As will therefore be apparent, when an index device is brought into the zone of the fingers 49 the upstanding index elements 13 engage and lift their corresponding fingers whilst the retracted elements 13 leave the corresponding fingers tilted forwards, again as is apparent from Figure 2 of the drawings. If the resultant adjustment of the fingers 49 brings each of the pins 51 into register with a corresponding aperture 55 in the reader plate, the latter will be allowed to tilt forwards under the load applied thereto by the arm 21. This represents a setting of the index device correlated to the combination provided on the particular reader mechanism (which, it will be observed, can readily be changed by replacing plate 52). For any other combination, any pin 51 not finding an appropriately-positioned aperture 55 will bear against the underside of plate 52 and the reader plate 36 will not tilt forwards.

As will further be understood, apertures such as 55 may be provided by perforations in a punched card detachably secured to the reader plate, e. g. by a clamping frame.

The reader mechanism illustrated is also designed to provide for accurate relative positioning between the mechanism itself and oncoming index devices to preclude installation or workshop inaccuracies, wear, and so on from interfering with the correct operation.

With this in view the side cheek 34 nearer the track rail 4 is equipped with an inverted guide channel 56 which is flared at its forward end 57 and cooperates with a stud 58 (see Figure 1) disposed at a corresponding part of the housing 12 of the index device. As can be clearly seen from Figure 4 of the drawings, the stud 58 is received in the guide channel 56 and this, by virtue of the allowance for rocking of the reader mechanism in a transverse plane by the pin and socket arrangement 28 and 31, together with the loose mounting of the spigot 28 in socket 31 which allows for the reader mechanism to be pivoted in a horizontal plane by the stud 58, if this is necessary, ensures that the adjustable part of the reader mechanism and its fingers are correctly disposed at the moment when the "sensing" is to take place. A set screw 59 carried by the plate 27 controls the displacement of sleeve 32'.

As will further be appreciated, the effect of the screw 44 acting on the reader plate 36 is normally to bias this plate downwards under the weight of the arm 21 and the load of the relatively powerful spring 46, which would normally mean that the adjustment of pins 51 by the action of a passing index device would have to take place against this bias.

To avoid this, and thus to "sensitize" the operation of the mechanism, the arm 21 is provided at its outer end, adjacent the nose 22, with a chamfered element 60 which is adapted periodically to ride over laterally extending members (not shown) arranged at appropriate intervals along the conveyor chain. These intervals are selected so that the forward end of the arm 21 is lifted each time that an index device 12 passes beneath the feeler fingers 49, with the result that, at this time, the reader plate 36 is relieved of the load indicated and is biased upwards at its forward end by the spring 38, thus facilitating the work to be performed by the fingers during their adjustment by the index element. When the projection in question has passed, the arm 21 is urged downwards again under the action of spring 46 and its own weight, and the screw 44 accordingly transmits this movement to the reader plate which, accordingly, will tilt forwards or not, according to whether an approved index device setting is passing or not.

In the affirmative case, the arm 21 will continue to descend, until it is held by the head 24 of bolt 25, this bringing the nose 22 into the trip position, in this case into accurate alignment with the nose of the hook 11, with the result that the work carrier will be swung over, and discarded from the conveyor as described above. In this event, the chamfered piece 60 will co-act with a following part of the conveyor mechanism to restore arm 21 upwards, and the consequent release of load on the reader plate will enable this to be pulled up by its spring 38 and the fingers, thereby released, to reset in the forwardly-tilted condition.

In the event, on the other hand, that the index device does not have an approved setting, then the reader plate 36 will be unable to tilt forwards as indicated, and the arm 21 will only descend into an intermediate position at which the screw 44 abuts the pad 42, 43 in the socket 41, and no further, so that the nose 22 will not descend to the trip position, i. e. to the level of the oncoming hook 11, and the work carrier concerned will be allowed to pass.

It is here reiterated that the system described is merely illustrative of the many possible forms of a system of the character set forth to which this invention can be applied. Moreover it is to be understood that the particular embodiment of reader mechanism described and illustrated in capable of modification within the scope of the appended claims. Hence, to cite one example only as an illustration, the pin and socket mounting means (28, 31) could be replaced by equivalent means such as a simple hook suspension or a ball and socket joint.

What I claim then is:

1. For a conveyor system for moving goods of the type having a plurality of index devices associated with the conveyor and supporting the goods and a plurality of reader mechanisms located along the path of the conveyor and each of which mechanisms is responsive to a particular setting of an index device to select such device and goods at the reader mechanism station, such reader mechanism comprising a support, a fixture disposed along the path of the conveyor, means on said fixture for mounting said support with a degree of universal movement with respect to said fixture, and an apertured reader plate pivoted on said support.

2. For a conveyor system for moving goods of the type having a plurality of index devices associated with the conveyor and supporting the goods and a plurality of reader mechanisms located along the path of the conveyor and each of which mechanisms is responsive to a particular setting of an index device to select such device and goods at the reader mechanism station, such reader mechanism comprising a frame, a fixture disposed along the path of the conveyor, suspension means on said fixture attaching said frame floatingly to the fixture and an apertured reader plate pivoted on said frame.

3. For a conveyor system for moving goods of the type having a plurality of index devices associated with the conveyor and supporting the goods and a plurality of reader mechanisms located along the path of the conveyor and each of which mechanisms is responsive to a particular setting of an index device to select such device and goods at the reader mechanism station, such reader mechanism comprising a frame, a fixture disposed along the path of the conveyor, adjustable suspension means on said fixture connecting said frame to the fixture with provision for a degree of universal play of said frame relatively to the fixture, and an apertured reader plate pivoted on said frame.

4. For a conveyor system for moving goods of the type having a plurality of index devices associated with the conveyor and supporting the goods and a plurality of reader mechanisms located along the path of the conveyor and each of which mechanisms is responsive to a particular setting of an index device to select such device and goods at the reader mechanism station, such reader mechanism comprising a frame, a fixture disposed along the path of the conveyor, adjustable suspension means on said fixture connecting said frame to the fixture with provision for a degree of universal play of said frame relatively to the fixture, an apertured reader plate pivoted on said frame and an inverted channel secured to said frame for cooperation with a passing index device to adjust the reader plate into correct reading position.

5. The reader mechanism of claim 3, wherein the suspension means comprises a spigot and socket connection in which the spigot is disposed with all-round clearance in the socket.

6. For a conveyor system for moving goods of the type having a plurality of index devices associated with the conveyor and supporting the goods and a plurality of reader mechanisms located along the path of the conveyor and each of which mechanisms is responsive to a particular setting of an index device to select such device and goods at the reader mechanism station, such reader mechanism comprising a frame, a fixture disposed along the path of the conveyor, means on said fixture for mounting said frame on the fixture, an apertured reader plate pivoted on said frame, a plurality of feeler fingers pivoted on said frame and each movable to bring a part alternatively into register with an apertured or imperforate plate portion and means operable in response to the conveyor travel to move said plate temporarily out of range of said fingers.

7. For a conveyor system for moving goods of the type having a plurality of index devices associated with the conveyor and supporting the goods and a plurality of reader mechanisms located along the path of the conveyor and each of which mechanisms is responsive to a particular setting of an index device to select such device and goods at the reader mechanism station, such reader mechanism comprising a frame, a fixture disposed along the path of the conveyor, adjustable suspension means on said fixture connecting said frame to the fixture with provision for a degree of universal play of said frame relatively to the fixture, an apertured reader plate pivoted on said frame, a plurality of feeler fingers pivoted on said frame and each movable to bring a part alternatively into register with an apertured or imperforate plate portion, trip means pivoted on a fixture and normally bearing on said reader plate to urge the latter downwards, and means for temporarily lifting said trip means and relieving the reader plate of the load thereof.

8. For a conveyor system for moving goods of the type having a plurality of index devices associated with the conveyor and supporting the goods and a plurality of reader mechanisms located along the path of the conveyor and each of which mechanisms is responsive to a particular setting of an index device to select such device and goods at the reader mechanism station, such reader mechanism comprising a frame, a fixture disposed along the path of the conveyor, adjustable suspension means on said fixture connecting said frame to the fixture with provision for a degree of universal play of said frame relatively to the fixture, an apertured reader plate pivoted on said frame, a plurality of feeler fingers pivoted on said frame and each movable to bring a part alternatively into register with an apertured or imperforate plate portion, trip means pivoted on a fixture and normally bearing on said reader plate to urge the latter downwards, means for temporarily lifting said trip means and relieving the reader plate of the load thereof and spring means for lifting said reader plate away from said fingers on relaxation of the load of said trip means.

9. For a conveyor system for moving goods of the type having a plurality of index devices associated with the conveyor and supporting the goods and a plurality of reader mechanisms located along the path of the conveyor and each of which mechanisms is responsive to a particular setting of an index device to select such device and goods at the reader mechanism station, such reader mechanism comprising a frame, a fixture disposed along the path of the conveyor, adjustable suspension means on said fixture connecting said frame to the fixture with provision for a degree of universal play of said frame relatively to the fixture, an apertured reader plate pivoted on said frame, a set of feeler fingers disposed side-by-side and individually pivotable on a common spindle secured to said frame to bring a part on this finger into register with an aperture or imperforate part carried by said plate, a trip arm pivoted on a fixed mounting and normally biassing said plate downwards and spring means for lifting said reader plate away from said fingers on relaxation of the load of said trip means.

10. The reader mechanism of claim 9, in which the trip arm is normally biased by a tension spring so as to bear against the reader plate, but has a part for periodic engagement by the travelling conveyor to rock the arm against the action of this tension spring and thereby temporarily relieve the load on the reader plate.

References Cited in the file of this patent
UNITED STATES PATENTS 1,803,391     Jennings _____ May 5, 1931